(12) United States Patent
Dorrance et al.

(10) Patent No.: US 8,553,236 B2
(45) Date of Patent: Oct. 8, 2013

(54) OPTICAL TARGETS FOR MACHINE VISION VEHICLE SERVICE SYSTEM

(75) Inventors: Daniel R. Dorrance, Ballwin, MO (US); Nicholas J. Colarelli, III, Creve Coeur, MO (US); Timothy A. Strege, Sunset Hills, MO (US); Thomas J. Golab, St. Peters, MO (US); David A. Voeller, St. Louis, MO (US); Mark S. Shylanski, University City, MO (US)

(73) Assignee: Hunter Engineering Company, St. Louis, MO (US)

( * ) Notice: Subject to any disclaimer, the term of this patent is extended or adjusted under 35 U.S.C. 154(b) by 507 days.

(21) Appl. No.: 12/873,455

(22) Filed: Sep. 1, 2010

(65) Prior Publication Data

US 2011/0051151 A1 Mar. 3, 2011

Related U.S. Application Data

(60) Provisional application No. 61/238,711, filed on Sep. 1, 2009.

(51) Int. Cl.
*G01B 11/14* (2006.01)
*G02B 5/12* (2006.01)

(52) U.S. Cl.
USPC .......................... 356/620; 359/524

(58) Field of Classification Search
USPC .......................................... 359/524
See application file for complete search history.

(56) References Cited

U.S. PATENT DOCUMENTS

| | | | | |
|---|---|---|---|---|
| 4,121,851 A | * | 10/1978 | Finkenbiner | 280/288.4 |
| 4,882,211 A | * | 11/1989 | McIntyre et al. | 428/41.6 |
| 5,466,502 A | * | 11/1995 | Wilkinson et al. | 428/42.1 |
| 5,532,816 A | * | 7/1996 | Spann et al. | 356/139.09 |
| 5,724,128 A | | 3/1998 | January | |
| 6,064,750 A | | 5/2000 | January et al. | |
| 6,482,510 B1 | * | 11/2002 | Rajan et al. | 428/349 |
| 6,710,866 B1 | | 3/2004 | Adolph | |
| 6,894,771 B1 | | 5/2005 | Dorrance et al. | |
| 7,177,740 B1 | * | 2/2007 | Guangjun et al. | 73/146 |
| 7,336,350 B2 | | 2/2008 | Dorrance et al. | |
| 7,444,752 B2 | | 11/2008 | Stieff et al. | |
| 7,466,430 B2 | * | 12/2008 | Braghiroli | 356/607 |
| 2005/0068522 A1 | * | 3/2005 | Dorrance et al. | 356/139.09 |
| 2007/0101595 A1 | * | 5/2007 | Jackson et al. | 33/293 |
| 2008/0186383 A1 | * | 8/2008 | Dorrance et al. | 348/148 |

OTHER PUBLICATIONS

Bosch, "Bosch Diagnostics OES. Solutions for efficient service", Bosch product literature No. AA-DG/MKT3 1 987 749 008, 12 pages, Sep. 2005, Plochingen, Germany.

Beissbarth, "Beissbarth—Workshop Equipment Recommended by BMW", Beissbarth product literature No. 1693 612 001 EN, 14 pages, Mar. 2009, Muenchen, Germany.

* cited by examiner

*Primary Examiner* — Gregory J. Toatley, Jr.
*Assistant Examiner* — Juan D Valentin, II
(74) *Attorney, Agent, or Firm* — Polster Lieder Woodruff & Lucchesi, L.C.

(57) ABSTRACT

An optical target for temporary application in non-determined placement on a surface of an object such as a vehicle wheel assembly within the field of view of an imaging sensor of a machine vision vehicle service system. The optical target consists of a flexible body which is relatively thin and generally flat, capable of conforming to the contours of a surface onto which it is secured in releasable manner by a means of adhesion. A set of visible optical elements are disposed on a front face of the target body for observation and imaging by the imaging sensors.

17 Claims, 3 Drawing Sheets

OPTICAL TARGETS FOR MACHINE VISION VEHICLE SERVICE SYSTEM

CROSS-REFERENCE TO RELATED APPLICATIONS

The present application is related to, and claims priority from, U.S. Provisional Patent Application Ser. No. 61/238,711 filed on Sep. 1, 2009, which is herein incorporated by reference.

STATEMENT REGARDING FEDERALLY SPONSORED RESEARCH

Not Applicable.

BACKGROUND OF THE INVENTION

The present invention is related generally to machine vision vehicle service systems, and in particular, to a multi-element optical target which may be temporarily positioned in a non-determined placement on a surface within a field of view of an imaging sensor associated with a machine vision vehicle service system during a vehicle service procedure, to facilitate the acquisition of measurements associated with the surface.

Machine vision vehicle service systems typically utilize one or more imaging sensors to acquire images of objects disposed within a field of view. The acquired images are processed by suitably configured processing systems to extract data associated with the observed objects. The extracted data may identify the position and orientation of the observed object within the field of view, or may provide measurements of movement of the object.

Some machine vision vehicle service systems are configured to process images of objects directly observed, i.e. the surfaces of wheel assemblies or wheel rims, vehicle body panels, or suspension components. These machine vision vehicle service systems require significant image processing capabilities, as the objects being observed are generally of an unknown configuration, which renders it difficult to obtain meaningful measurements without the use of complex imaging sensor configurations or advanced image processing techniques.

Traditionally, most machine vision vehicle service systems require the operator to dispose one or more optical target structures within the field of view of the imaging sensors prior to the acquisition of the images. The optical target structures have known or predetermined features which are highly visible to the imaging sensors, such as retro-reflective geometric patterns, and are disposed in the field of view in such a manner as to be associated with the objects being observed. For example, it is well known to secure rigid optical target structures, such as shown in U.S. Pat. No. 6,710,866 B1 to Adolph having a plurality of optical target elements onto a vehicle body panel or onto vehicle wheel assemblies using a mounting or other attachment structure which can be removably secured to the wheel assembly in a fixed relationship. The use of optical target structures provides the imaging sensors with highly visible elements in the acquired images, which have known features for subsequent image processing. Since the optical target structures are mounted in association with the observed objects, position and measurement data acquired from the observation of the optical targets may be related to the observed object.

While the use of optical target structures offers distinct advantages to a machine vision vehicle service system in terms of processing the images acquired by the imaging sensors, it introduces a new set of problems. In particular, the construction of the optical target structures is time consuming and expensive, as they are manufactured to precise specifications, and they require specialized mounting components for attachment to the object surfaces, such as wheel assemblies, which limit the possible placement locations within a field of view.

Accordingly, it would be advantageous to provide a low-cost optical target which may be temporarily placed in a non-determined position on a wide range of object surfaces within the field of view of a machine vision vehicle service system to provide a set of identifiable features or target elements within an acquired image for subsequent measurement processing. It would be further advantageous to provide such a low-cost optical target with a means for attachment to the object surfaces which does not require specialized mounting structures, and which is readily removable and is optionally reusable or consumable.

BRIEF SUMMARY OF THE INVENTION

Briefly stated, the present disclosure provides an optical target for temporary application to a surface of a vehicle wheel assembly in a non-determined position within the field of view of an imaging sensor of a machine vision vehicle service system. The optical target consists of a body defined by a sheet of material such as vinyl, paper, or cardboard, may optionally include a layer of a self-adhesive material applied to a back surface, and further includes at least one optical target element disposed on the opposite (front) surface for observation by the imaging sensor.

In one embodiment of the present disclosure, the optical target is composed of a flat body of a flexible vinyl material adapted to conform to the surface of a wheel assembly. A releasable contact adhesive is disposed on the back surface, while a set of high-contrast optical target elements are printed on a front surface in a predetermined configuration.

During use with a machine vision vehicle service system, one or more optical targets of the present disclosure are positioned in non-determined placement onto the surfaces of a vehicle wheel assembly to be observed, such as by the self adhesive material, with the front face optical target elements are generally visible to the imaging sensors of the machine vision vehicle service system. Images of the vehicle wheel assembly, and the associated optical targets are acquired by the imaging sensors, and are processed to identity any visible optical target elements. Processing of the images of the identified visible optical target elements, together with the predetermined configuration of the optical target elements on the optical targets, provide measurement data associated with the various optical targets present in the field of view, and which corresponds to measurement data associated with the surfaces of the vehicle wheel assembly onto which the optical targets are presently positioned. Upon completion of a vehicle service procedure, the optical targets are removed from the object surfaces and are stored for future use, or are discarded.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
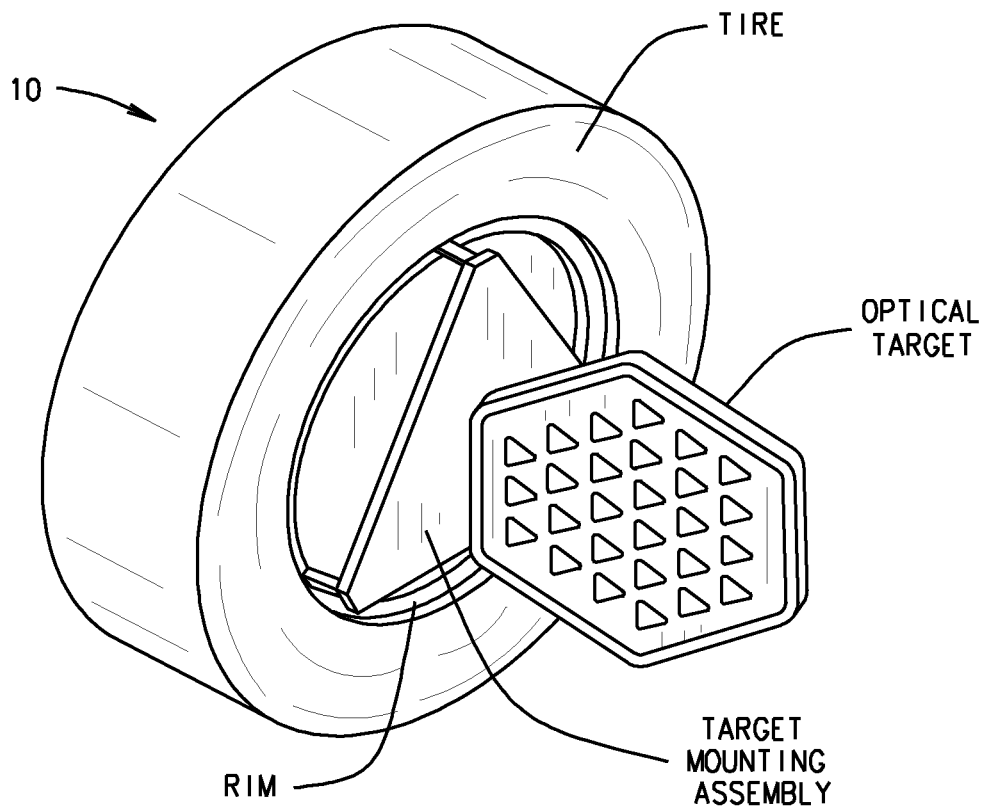
FIG. 1 is a perspective view of a prior art optical target mounted to a wheel assembly.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
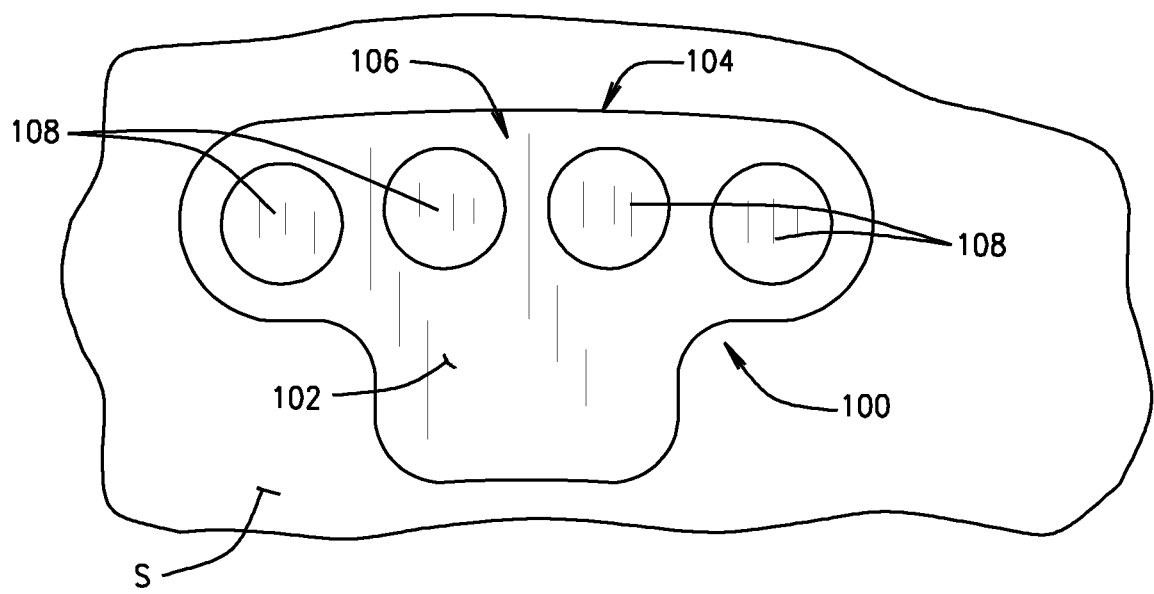
FIG. 2 is a front view of an exemplary optical target of the present disclosure.

Turning to the figures in general, and to FIG. 2 in particular, an optical target of the present disclosure for temporary application to the surface S of an object 10, such as a vehicle wheel assembly or vehicle body panel, within the field of view of an imaging sensor 12 of a machine vision vehicle service system. The optical target 100 consists of a generally planar body 102 defined by a sheet or layer of flexible material having a back surface 104 adapted for placement against the surface S of the object 10, such as a paper, cardboard, or vinyl material. The material is preferably sufficiently flexible to conform to the contours of the surface S of the vehicle wheel assembly or other object onto which the target 100 is being disposed, and is preferably sufficiently durable to withstand repeated uses without ripping, tearing, or deforming. However, it will be readily recognized that durability of the optical targets 100 is not required, and that the optical targets 100 may be manufactured as a consumable product, intended for disposal after only one or more uses.

As used herein, the phrase "planar body" is not intended to be limited to a rigid structure, but rather, is intended to describe a structure having two dimensions (length and width) which are significantly greater in size than the third dimension (thickness). The front surface 106 of the planar body 102, opposite the back surface 104, includes a set of optical target elements 108 having generally known features and relationships. The optical target elements 108 are preferably in the form of markings on the front surface 106 which are highly contrasted against the front surface 106.

For example, as seen in FIG. 2, the optical target elements 108 may be in the form of black circles disposed on a white surface 106. Those of ordinary skill in the art will recognize that the optical target elements 108 may be formed in any manner suitable for observation by the imaging sensors 12 of the machine vision vehicle service system 14, and may include the use of color, retro-reflective materials, or optical patterns.

Figure 3:
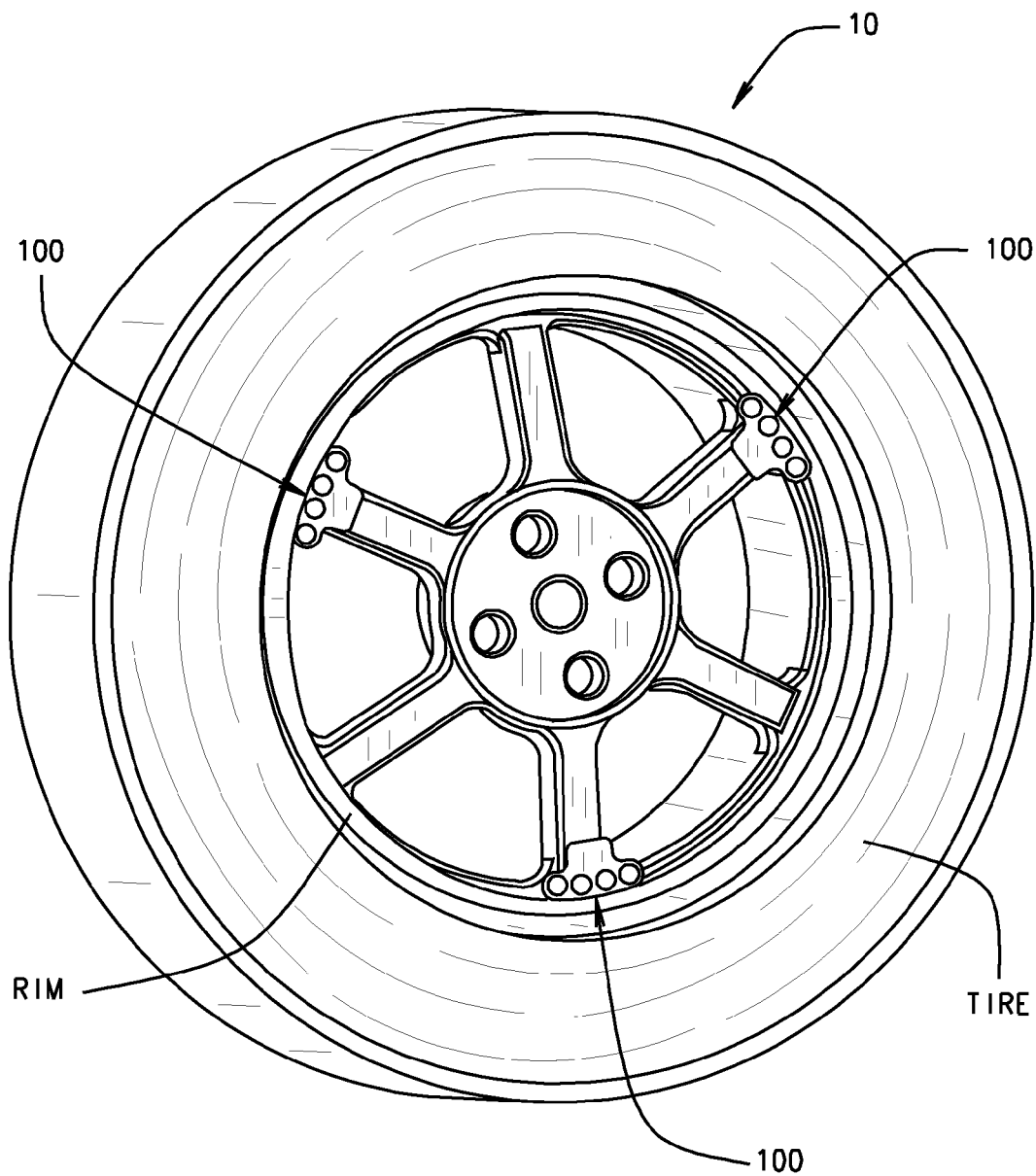
FIG. 3 is a perspective view of a wheel assembly onto which three of the exemplary optical targets of FIG. 2 have been temporarily placed at the spoke/rim junctions.

The optical target 100 is intended for temporary placement against the surface S of an object in a non-determined location, without the use of a mounting structure or other external attachment means, such as shown in FIG. 3. As used herein, the phrase "non-determined location" describes a placement location on the surface S of an object such as a vehicle wheel assembly which is not predetermined or known in advance, such as a required target placement position. For example, a non-determined location on a vehicle wheel assembly may be on any surface between an axis of rotation of the vehicle wheel assembly and an outer rim lip of the vehicle wheel assembly.

Preferably, the optical target 100 is self-adhesive, and includes an adhesive means such as a releasable contact adhesive layer disposed on the back surface 104, which permits the optical target to be smoothly applied directly on the object surface S. If the planar body 102 is flexible, the flexible nature of the planar body 102 may be conformed to the shape of the object surface S at the placement location. Alternatively, if the planar body 102 is rigid, the planar body 102 will define a flat surface secured to the object's surface S. Those of ordinary skill in the art will recognize that a variety of means for adhesion may be employed to temporarily secure the optical target 100 to the object surface S, and are not limited to applied layers of glues or chemical compositions. For example, the means for adhesion may including frictional engagement between the back surface 104 and the object surface S, electrostatic attraction, intermolecular attraction such as van der Waals forces, or water surface tension (i.e., wetting the surface before application of the optical target 100). Preferably, the means for adhesion employed with the optical target 100 permits easy removal of the optical target 100 from the object surface S, leaves little or no residue on the object surface S, does not damage or destroy the optical target 100, and permits optional re-use or re-positioning of the optical target 100.

Figure 4:
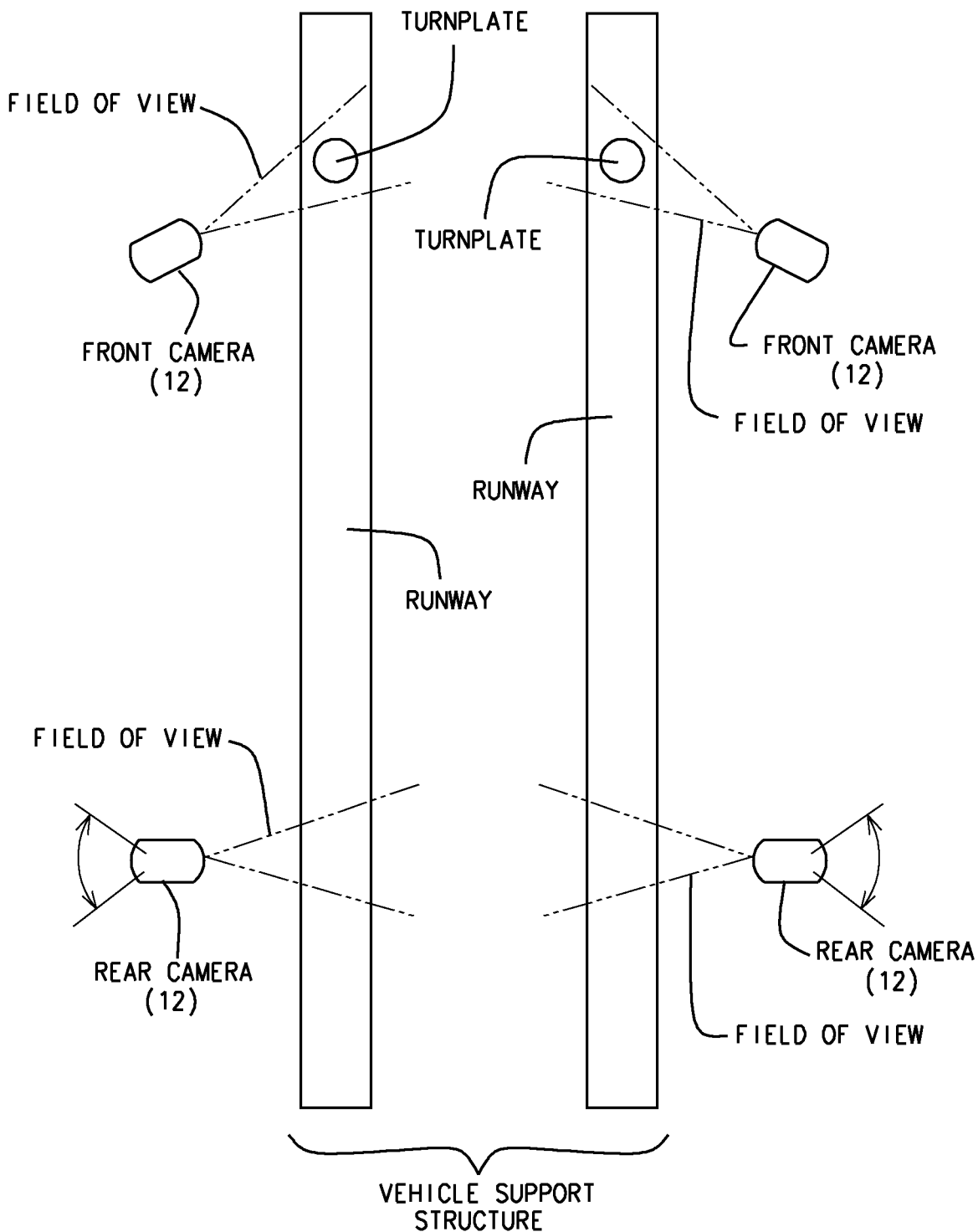
FIG. 4 illustrates an exemplary placement of cameras for viewing optical targets of the present disclosure placed on the wheels of a vehicle disposed on a vehicle support structure during a service procedure.

During use with a machine vision vehicle service system, one or more optical targets 100 of the present disclosure are positioned in non-determined placement onto the surfaces S of an object 10 such as a vehicle wheel assembly to be observed, with the releasable adhesive or other attachment means, as seen in FIG. 3. The optical targets 100 are positioned such that the front face 106 and the optical target elements 108 are generally visible to the imaging sensors 12 of the machine vision vehicle service system. For example, as shown in FIG. 4, imaging sensors 12 may be disposed in proximity to the location of a vehicle's wheels when the vehicle is positioned on a vehicle support structure, such as a lift. Preferably, the field of view of each imaging sensor, which may be fixed or adjustable, is aligned generally perpendicular to the object surface S to facilitate viewing of the optical targets 100, however, those of ordinary skill in the art of machine vision systems will recognized that the imaging sensors 12 may be disposed in a variety of positions and configurations to acquire images of the optical targets 100 within associated fields of view.

Images of the object or wheel assembly surface S, and the associated optical targets 100 are acquired by the imaging sensors 12, and are processed according to known image processing techniques to identity images of optical target elements 108 present in the associated fields of view. Processing of the images of the identified visible optical target elements 108, together with data associated with the predetermined configuration of the optical target elements 108 on the optical targets 100, provides measurement data associated with the position and orientation of the various optical targets 100 present in the field of view of the imaging sensors 12, and which corresponds to measurement data associated with the surfaces S of the objects 10 such as vehicle wheel assemblies, onto which the optical targets 100 are presently positioned. Image processing algorithms and techniques for determining spatial position and orientation of the optical targets and object surfaces are well known to those of ordinary skill in the field of machine vision vehicle service systems. For example, suitable image processing algorithms and techniques for acquiring three-dimensional information from objects or targets identified in the field of view of an imaging sensor 12 can be found in U.S. Pat. No. 7,444,752 B2 to Stieff et al., in U.S. Pat. No. 7,336,350 to Dorrance et al., and in U.S. Pat. No. 6,894,771 B1 to Dorrance et al., each of which is herein incorporated by reference. Additional techniques for processing acquired images of optical targets can be found in U.S. Pat. No. 6,064,750 to January et al. and in U.S. Pat. No. 5,724,128 to January, both of which are incorporated by reference.

Upon completion of a vehicle service procedure, the optical targets 100 are removed from the object surfaces and are either stored for future use, or are discarded and replaced if they are damaged, dirty, or lack remaining suitable adhesive characteristics.

Those of ordinary skill in the art will recognize that the particular configuration and shape of the optical target 100, as well as the arrangement of the optical target elements 108 on the front face 106 is not limited to the configuration shown in the Figures, and that any suitable shape and arrangement having identifiable features required for measurement of the intended characteristics of an object's surface may be utilized. For example, the number and shape of the optical target elements 108 may be varied from circles to triangles, and from an arcuate pattern to a linear pattern without departing from the scope of the present disclosure.

It will further be recognized by those of ordinary skill in the art that the optical targets 100 need not be manufactured in a controlled high-precision fashion, but rather, may be printed on-demand onto a suitable body material 102 such as pre-cut self-adhesive stickers or labels supported on a sheet of release paper, using commonly available printing systems such as a laser printer, thermal printer, or an ink-jet printer, controlled by suitable software applications. Hence, a vehicle service shop could print a set of consumable optical targets 100 onto suitable medium at the start of each work day, utilize the optical targets 100 during the work day, and discard them at the end of the work day for replacement the next work day. The software applications controlling the printing system may be configured to produce optical targets 100 of varying sizes and/or shapes, having varying configurations of optical target elements, depending upon the particular application for which the optical target 100 is to be utilized. It will further be recognized that the software applications for controlling the printing of the optical targets may reside in sub-programs or subroutines incorporated into a vehicle service system, such as a wheel alignment system.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An optical target for temporary application to a surface of a vehicle wheel assembly within a field of view of an imaging sensor of a machine vision vehicle service system, comprising:
   a generally planar body having a set of two-dimensional optical target elements disposed on an visible front surface, a rear surface of said generally planar body, opposite said front surface, adapted for direct adhesion in a non-determined placement onto the surface of the vehicle wheel assembly; and
   wherein said generally planar body is sufficiently flexible to temporarily conform to a contour of the surface of the vehicle wheel assembly.

2. The optical target of claim 1 wherein said planar body further includes a means for adhesion disposed on said rear surface.

3. The optical target of claim 2 wherein said means for adhesion consists of a releasable contact adhesive.

4. The optical target of claim 2 wherein said means for adhesion is integral with said planar body.

5. The optical target of claim 4 wherein said means for adhesion is adapted to secure said body to said object surface by electrostatic means.

6. The optical target of claim 4 wherein said means for adhesion is adapted secure said body to said object surface by intermolecular van der Waals forces.

7. The optical target of claim 1 wherein said generally planar body is defined by a sheet of material selected from a set of materials including vinyl, paper, plastic, and cardboard.

8. The optical target of claim 1 wherein said set of optical target elements are printed onto said front surface by a printing system, said printing system selected from a set of printing systems including a laser printer, an inkjet printer, and a thermal transfer printer.

9. The optical target of claim 1 wherein said body is of a consumable manufacture.

10. The optical target of claim 1 wherein said non-determined placement on the surface of the vehicle wheel assembly is between an axis of rotation of the vehicle wheel assembly and an outer rim lip of the vehicle wheel assembly.

11. A method for using an optical target with a machine vision vehicle service system having at least one imaging sensor for acquiring images of a surface of a vehicle wheel assembly consisting of a tire mounted to a vehicle wheel rim, within a field of view, comprising:
   providing at least one optical target, said optical target having a generally planar flexible body with a plurality of visible optical elements on a front face of said generally planar flexible body and a means for adhesion to a surface of the vehicle wheel assembly on a rear face of said generally planar flexible body;
   disposing said at least one optical target in a non-determined placement on the vehicle wheel assembly surface, said at least one optical target conforming to a contour of said vehicle wheel assembly surface at the placement position;
   acquiring, though said at least one imaging sensor, at least one image of the field of view including said visible optical elements;
   processing said acquired image to identify said visible optical elements and to determine measurement data associated therewith; and
   upon completion of image acquisition, removing said optical target from said surface of the vehicle wheel assembly.

12. The method of claim 11 wherein said step of disposing further includes temporarily conforming said generally planar flexible body to a contour of said vehicle wheel assembly surface.

13. The method of claim 11 further including the step of storing said optical target following removal from said surface of the vehicle wheel assembly.

14. The method of claim 11 further including the step of discarding said optical target following removal from said surface of the vehicle wheel assembly.

15. The method of claim 11 further including the step of cleaning the surface of the object prior to disposing said reusable optical target directly onto the surface of the vehicle wheel assembly.

16. The method of claim 11 further including the step of printing, on demand, at least one reusable optical target to be disposed onto the surface of the object, said printing carried out under control of a software program by a printing system selected from a set of printing systems including a laser printer, an inkjet printer, and a thermal transfer printer.

17. The method of claim 11 wherein said step of disposing includes disposing said at least one optical target on the vehicle wheel assembly surface between a wheel rim and an axial center point of the wheel rim.

* * * * *